United States Patent Office 2,989,037
Patented June 20, 1961

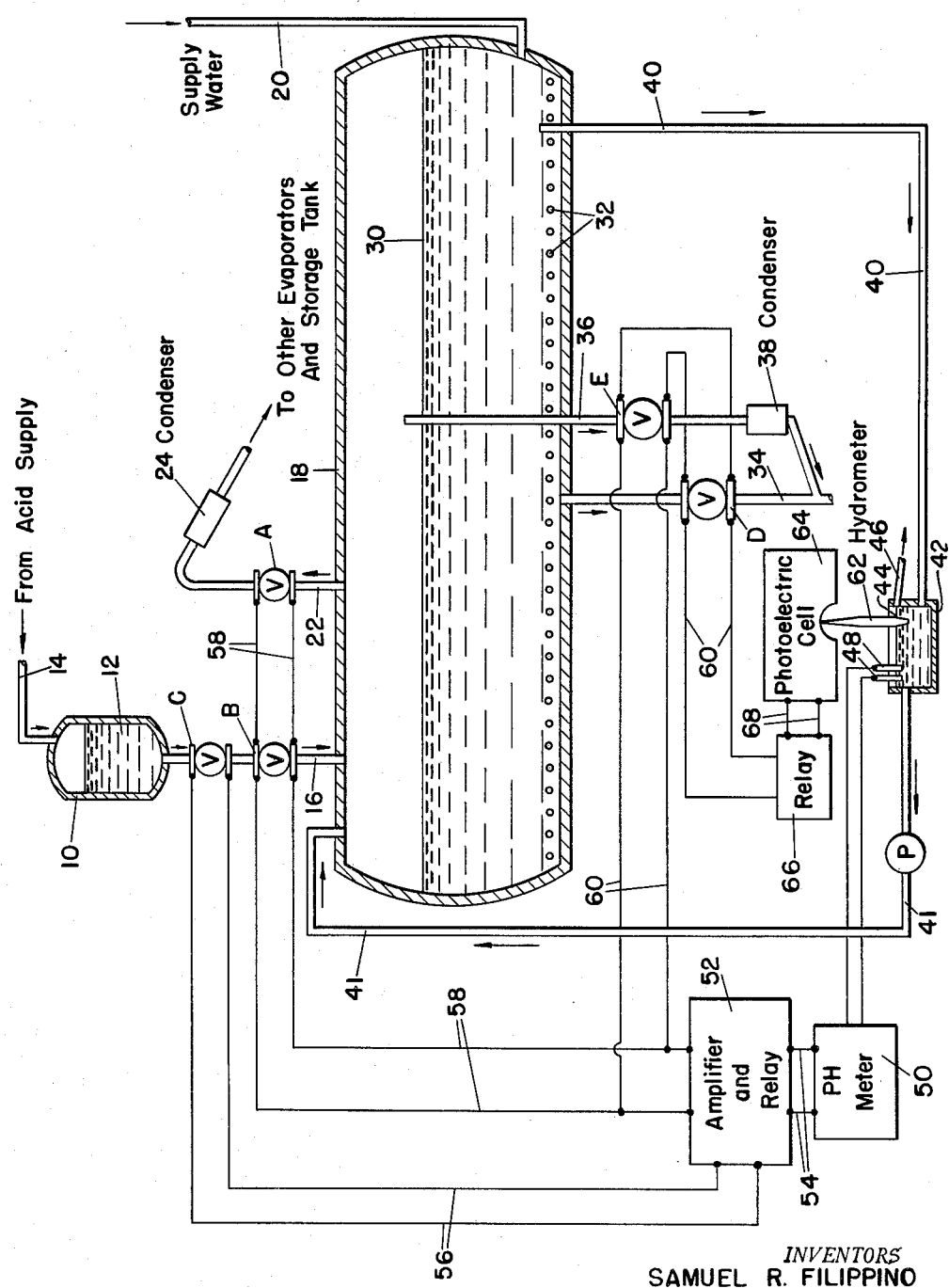

2,989,037
AUTOMATIC GRAVITY FEED WATER SYSTEM AND CONTROL
Samuel Robert Filippino, 801 Yeadon Ave., Yeadon, Pa., and David C. Rabinowitz, 1248 Kenwood Ave., Camden 3, N.J.
Filed June 30, 1959, Ser. No. 824,160
3 Claims. (Cl. 122—379)
(Granted under Title 35, U.S. Code (1952), sec. 266)

The invention described herein may be manufactured and used by or for the Government of the United States of America for governmental purposes without the payment of any royalties thereon or therefor.

This invention relates to water distilling plants and more particularly to automatic feed water apparatus for preventing scale depositions on the heat exchanger surfaces and interior of evaporators.

The invention has particular application to distilling plants of naval shore establishments using city water, however the apparatus of the present invention can be readily modified for use equally well with fresh water sources aboard ships. After the supply water from whatever source reaches the evaporator feed pump, it is customarily circulated through various heater tubes to thereby raise the temperature and serve to decrease the quantity of heat required to convert the water into vapor in the evaporators. Each evaporator is provided with heat exchanger tubes for the passage of steam which function to vaporize the heated water within the evaporator, and then through a series of baffles and condensers, and finally into a distilled water storage tank.

After continuous operation of the evaporators over short periods of time, for example, several weeks, and particularly when the supply water is high in carbonates, scales and depositions form on the surfaces of the evaporator equipment which results in inefficient heat transfer, and if the depositions accumulate to a high degree, the evaporators are rendered completely inoperable. To combat undesirable scaling and depositions, various expedients have been resorted to for removal of deposits. One practice is to add cornstarch to the feed water to render the harmful solids plastic or semi-plastic in order to permit its easier removal. However, none of the practices with which applicants are familiar have been entirely effective or are prohibitively expensive. The most effective way to overcome the problem is to completely shut down the evaporator and remove the scales by chipping or acid cleaning, but, of course, this removes the evaporator from production for periods of several days and, in addition, the equipment cannot stand the repeated cleanings and in any event this recourse has been found otherwise very expensive.

In its broad aspects, this invention overcomes to a great degree the aforementioned problems by providing a system or apparatus which will maintain the pH of the feed water within the evaporators at optimum values so that scaling on heat exchanger surfaces and the interior of evaporators is reduced to a minimum.

Another object of the invention is to treat the feed water in such a manner as to minimize scale formation on the evaporator heat exchanger surfaces.

A more specific object of the invention is to utilize selected chemicals for maintaining an optimum pH value of the feed water within the evaporator and thus prevent harmful depositions on the evaporator heat exchanger surfaces.

Other objects and advantages of the invention will hereinafter become more fully apparent from the following description of the single figure drawing which is a vertical sectional view of one embodiment of the invention with the electrical components shown schematically.

Referring to the drawing, there is shown a reservoir 10 for containing a liquid chemical 12, such as acetic acid, or a complexing agent, such as ethylene diamine tetraacetic acid, the reservoir being provided with a liquid chemical supply line 14 and a chemical gravity feed line 16, which communicates with a horizontally disposed evaporator 18. The evaporator 18 has a water supply line 20 and a vapor discharge line 22 which may lead to another evaporator or other evaporators (not shown), it being understood that the quantity of distilled water desired will govern the total number of evaporators in a system. A series of electric valves which are indicated by capital letters are used in the system. The vapor line 22 is provided, for example, with a solenoid control valve A and a condenser 24, the valve A being serially connected with a second solenoid valve B in the chemical feed line 16, while a third solenoid valve C is also positioned in feed line 16 but above valve B. Valve A serves to control the passage of vapor from evaporator 18 while valves B and C function to cooperate in the control of the chemical to the evaporator 18 as will be described more fully later. The evaporator 18 is partially filled to a predetermined height 30 with a mixture of supply water and chemical additive and disposed in the lower portion of evaporator 18 are heat exchanger tubes 32 for maintaining the desired temperature of the liquid mixture contained within the evaporator. Another solenoid control or "blow-down" valve D is provided in a main drain pipe 34, the latter communicating with the evaporator 18 below the heat exchanger tubes 32 to permit the effective drainage of any solids which may accumulate. A vapor drain pipe 36 extends upwardly into evaporator 18 and opens above the liquid level 30 and preferably is positioned adjacent to main drain pipe 34, and functions to drain off steam and vapors which may accumulate within the evaporator when valve A is closed. The vapor drain pipe 36 is provided with a solenoid control valve E, while a vapor condenser 38 is disposed outside the evaporator 18 and the condensed vapors are fed into the main drain 34.

An important feature of the invention resides in the use of a recycle branch comprising conduits 40, 41 and a pump P which provides for recycling of a predetermined quantity of the liquid mixture to and from the evaporator for sampling. A water jacket or pan 42 is interposed in one of the recycle branch lines 40 or 41 and a level indicated at 44 is maintained by the provision of an upper drain pipe 46 and the regulated supply of liquid to the evaporator 18 and its removal from the evaporator 18 to provide for the partial submergence of electrodes 48—48 of a pH meter 50. The pH meter operates through the electrodes 48—48 to read continuous values of the pH of the recycled liquid and to emit signals in accordance with the pH readings. These signals from the meter 50 are fed into an amplifier and relay unit 52 through conductors 54—54 and depending on the pH reading to actuate either the solenoid valve C through conductors 56—56 or the other solenoid valves A and B and D and E through conductors 58—58 and 60—60. A hydrometer 62, supported by the liquid in pan 42, controls a photo-electric cell 64 for energizing a relay unit 66 through conductors 68—68 and serves to selectively control the valves D, E, B and A.

In operation, predetermined quantities of a chemical such as acetic acid or ethylene diamine tetra-acetic acid 12 is added to the supply water within the evaporator and the turbulence created by the entry of the supply water effects a uniform mixture therein. If the supply water is normally basic, that is, its pH value is in excess of 7.0, harmful deposit-forming compounds will be contained therein, which will form scaling on heat exchanger surfaces and the interior of the evaporator. By careful control of acid additions, the pH of the liquid may be maintained at desired values, or within a range of 6.5–7.0, and thus effectively decomposing any carbonates of the supply water and preventing any harmful depositions from occurring. Recirculation or recycling of the liquid is effected by means of a pump P, and a sample of the pH values of the liquid within the evaporator may be continuously determined through the pH meter. When the pH meter reads in excess of 7.0, or basic, the signals emitted therefrom through conductors 54—54 and transmitted to the amplifier and relay unit will energize the normally closed valve C through conductors 56—56 to permit the flow of acid through the valve and normally open valve B into the evaporator, and thus lowering the pH of the liquid to its desired values. When the liquid within the evaporator becomes sufficiently acidic, that is, a pH value of 6.5–7.0, the valve C will be similarly de-energized to maintain it in its normally closed position. Should the pH reading fall below a value of 6.0, which would be indicative of a breakdown in the system, and principally a malfunctioning or inoperability of the pH meter, then the amplifier and relay unit 52, upon the absence of signals being received by it from the pH meter of several seconds duration or longer, will serve to close the normally open valve at B to prevent further acid from being introduced into the evaporator. At the instant valve B is caused to be closed, normally open valve A, which is connected in parallel therewith through conductors 58—58, will be similarly closed, and thus preclude the possibility of any steam or vapors within the evaporator from passing into succeeding evaporators. At this instant, also, the normally closed valves D and E, are energized through conductors 60—60 which are connected in parallel with conductors 58—58 and will open, to thereby cause the excessively chemically treated liquids and vapors to be drained through line 34.

After extended operation of the evaporators, say, 10 days to 2 weeks, the decomposition of the impurities contained in the supply water by the chemical by-products, namely, carbon dioxide and water, the former reacting with the sodium ions contained in the supply water to form a sodium carbonate, which will accumulate to such an extent that the solubility product of it in the water will have been exceeded and causing the sodium carbonate to form a deposit within the evaporator below the heat exchanger tubes. Therefore, the hydrometer, which responds to differences in specific gravities of liquids, will rise to actuate the photoelectric cell when the specific gravity of the liquid within the evaporator increases to the point where it is equivalent to the solubility product of the dissolved salts, mainly sodium carbonate, in the liquid. The actuation of the photoelectric cell energizes the relay unit 66 which, in turn, actuates the normally closed valve at D to permit the effective "blow-down" of the sodium carbonate in the evaporator. The valve E, also normally closed, is serially connected to valve D and will be similarly energized allowing the vapors contained within the evaporator to drain therethrough. During any automatic "blow-down" operation, the steam and vapors within the evaporator will not pass into the next evaporator, nor will any chemical enter the evaporator, for, as shown in the drawing, and described earlier, the conductors 60—60 and 58—58 serially connect valve E to valves B and D, both of the latter valves being of the normally open type, to render any communication through these valves impossible.

Summarizing, there is herein disclosed novel apparatus, having safety features annexed thereinto, for effectively preventing harmful scaling and depositions of insoluble carbonates on the heat exchanger surfaces and interior of evaporators used in large distilling operations, and by means of the automatic circuitry cooperating therewith, an efficient, simple and inexpensive apparatus has been provided.

Obviously, modifications in arrangement and control circuitries may be made and resorted to by those skilled in the art without departing from the spirit and scope of the invention. It is therefore to be understood, that within the scope of the appended claims, the invention may be practiced otherwise than as specifically described.

What is claimed is:

1. Apparatus for preventing scale formation in water evaporators comprising a chemical treating agent reservoir disposed above the evaporator and a feed line interconnecting said reservoir and evaporator for supplying the treating agent to the evaporator by gravity, a normally closed electrically actuated valve in said feed line, a normally open electrically actuated valve in said feed line below said normally closed valve, control means for the supply of chemical treating agent to the evaporator, said control means comprising a conduit system exteriorly of the evaporator for continuously recycling liquid from the evaporator and returning it to the evaporator, an electrical circuit including a pH meter having its electrodes positioned in the conduit system to be continuously contacted by the recycled liquid, first connections between the pH meter and the normally closed valve, second connections between the pH meter and the normally open valve, said first connections being operative to open the normally closed valve when the pH value of the recycled liquid rises above a predetermined high value in order to supply the treating agent to the liquid in the evaporator and operative to return said valve to closed position when the pH value of the recycled liquid reaches a predetermined intermediate value and said second connections being operative to close the normally open valve when the pH value of the recycled liquid drops to a predetermined low value.

2. Apparatus as in claim 1, further characterized by a vapor line communicating with said evaporator and having a normally open electrically actuated valve therein in parallel with the normally open valve in said feed line and actuatable to closed position simultaneously therewith.

3. Apparatus as in claim 1, further characterized by a liquid drain line having a normally closed electrically actuated valve therein and a vapor drain line having a normally closed electrically actuated valve therein and means responsive to the specific gravity of the recycled liquid in the conduit system for opening both said normally closed valves when the specific gravity of the recycled liquid reaches a predetermined high value.

References Cited in the file of this patent

UNITED STATES PATENTS

| | | |
|---|---|---|
| 1,405,783 | Holla | Feb. 7, 1922 |
| 1,531,993 | Speller | Mar. 31, 1925 |
| 2,602,644 | Sandstrom | July 8, 1952 |
| 2,723,755 | Robinson | Nov. 15, 1955 |
| 2,851,016 | Kinderman | Sept. 9, 1958 |

FOREIGN PATENTS

| | | |
|---|---|---|
| 801,759 | Great Britain | Sept. 17, 1958 |